United States Patent Office 2,972,618
Patented Feb. 21, 1961

2,972,618

ADDUCTS OF HETEROCYCLIC AMIDES

Newman M. Bortnick, Oreland, Pa., assignor to Rohm & Haas Company, Philadelphia, Pa., a corporation of Delaware No Drawing. Filed Dec. 5, 1956, Ser. No. 626,310

5 Claims. (Cl. 260—309.5)

This invention concerns adducts of heterocyclic amides and specific α,β-unsaturated compounds. It further deals with a method of preparation for these adducts.

The heterocyclic amides employed in this invention may be represented by the formula

in which L is a three- to four-membered divalent chain containing one nitrogen atom and two to three carbon atoms, wherein one of the carbon atoms of L must have attached thereto either an oxygen or sulfur atom, and Y is a chalcogen having an atomic weight of 16 to 32, i.e. oxygen or sulfur. There must be at least one carbon atom between the nitrogen atoms of the heterocyclic amides when the amide is considered in a counter-clockwise direction. The carbon atom or atoms in the L group may have their remaining valences satisfied by hydrogen atoms, by alkyl groups whose total carbon atom content is no greater than 18, or by combinations of hydrogen atoms and alkyl groups. When L contains two carbon atoms, one carbon atom will bear an oxygen or sulfur atom and the other carbon atom will have two valences to be satisfied by hydrogen atoms, alkyl groups, or combinations thereof. When L contains three carbon atoms, one carbon atom will bear an oxygen or sulfur atom and the other two carbon atoms will have a total of four valences to be satisfied by hydrogen atoms, alkyl groups, or combinations thereof. It is also possible that the above-mentioned alkyl substituents be joined together to form carbocyclic rings in conjunction with the L chain, if desired.

The nitrogen atom in the L chain may occupy any spatial position except immediately next to the other nitrogen atom in the heterocyclic amide. It is preferred that the nitrogen atom of the L chain be vicinal to the carbonyl carbon that is not in the L chain. It is particularly preferred that a nitrogen atom and a carbonyl carbon be grouped in vicinal pairs in the heterocyclic amide.

The nitrogen atom in the L chain may have its remaining valence satisfied by a hydrogen atom, an alkyl, including cycloalkyl and alkylcycloalkyl groups of one to eighteen carbon atoms, an aryl, alkylaryl, arylalkyl, or alkylarylalkyl group of six to eighteen carbon atoms, a hydroxyalkyl group of two to eight carbon atoms in which the hydroxy group is no closer than the beta position with respect to the nitrogen atom concerned, an alkenyl group of two to eighteen carbon atoms, an aminoalkyl group or alkylaminoalkyl group or dialkylaminoalkyl group of two to eight carbon atoms in which the amino group is no closer than the beta position with respect to the ring nitrogen atom, an alkoxyalkyl group containing up to nineteen carbon atoms in which the alkoxy portion contains up to eight carbon atoms and the alkyl portion contains at least two carbon atoms, an alkenoxyalkyl group of up to nineteen carbon atoms in which the alkenoxy portion contains up to eight carbon atoms and the alkyl portion contains at least two carbon atoms, a cyano group, and a cyanoalkyl group in which the alkyl part contains up to eight carbon atoms.

The alkyl substituents on the carbon atoms of the L chain may have any possible spatial configuration, such as normal, iso-, tertiary, and the like. Likewise, the alkyl and alkenyl substituents and substituted groups thereof on the nitrogen atom in the L chain may have any possible spatial structure. Also, alkyl groups on saturated or unsaturated cyclic substituents may occupy any possible spatial position. The double bond in the alkenyl groups may be at any possible location.

Typical of the alkyl substituents that may be used to satisfy the remaining valences of the carbon atoms in the L chain include methyl, ethyl, propyl, butyl, hexyl, octyl, decyl, dodecyl, tridecyl, and octadecyl groups.

Typical of the substituents, other than a hydrogen atom, that may satisfy the remaining valence of the nitrogen in the L chain include methyl, ethyl, propyl, butyl, pentyl, hexyl, octyl, nonyl, decyl, dodecyl, tetradecyl, octadecyl, cyclobutyl, cyclopentyl, propylcyclopentyl, octylcyclopentyl, cyclohexyl, butylcyclohexyl, vinyl, allyl, butenyl, pentenyl, hexenyl, heptenyl, octenyl, decenyl, dodecenyl, octadecenyl, phenyl, benzyl, phenylethyl, phenylbutyl, phenyloctyl, phenyldodecyl, butylphenylpentyl, butylphenyl, octylphenyl, dodecylphenyl, naphthyl, naphthylethyl, naphthylbutyl, naphthyloctyl, hydroxyethyl, hydroxypropyl, hydroxybutyl, hydroxypentyl, hydroxyoctyl, aminoethyl, aminopropyl, aminobutyl, aminopentyl, aminooctyl, ethylaminoethyl, butylaminoethyl, dimethylaminopropyl, diethylaminobutyl, methoxyethyl, methoxybutyl, methoxyheptyl, methoxydecyl, methoxytetradecyl, methoxyoctadecyl, ethoxyethyl, ethoxybutyl, ethoxyhexyl, ethoxydecyl, ethoxydodecyl, propoxyethyl, propoxypropyl, propoxypentyl, propoxyoctyl, propoxyhexadecyl, butoxyethyl, butoxypropyl, butoxybutyl, butoxyhexyl, butoxyoctyl, butoxydecyl, butoxydodecyl, butoxytetradecyl, pentoxyethyl, pentoxypropyl, pentoxybutyl, pentoxydecyl, pentoxydodecyl, pentoxytetradecyl, hexoxyethyl, hexoxypropyl, hexoxybutyl, hexoxyhexyl, hexoxydecyl, hexoxydodecyl, heptoxyethyl, heptoxypropyl, heptoxybutyl, heptoxyheptyl, heptoxyoctyl, heptoxydodecyl, octoxyethyl, octoxypentyl, octoxyoctyl, octoxynonyl, octoxydecyl, nonoxyethyl, nonoxypentyl, nonoxynonyl, nonoxydecyl, decoxyethyl, decoxypentyl, decoxyheptyl, decoxynonyl, undecoxyethyl, undecoxyhexyl, dodecoxyethyl, dodecoxyhexyl, tridecoxyethyl, tridecoxyhexyl, tetradecoxyethyl, tetradecoxypentyl, pentadecoxyethyl, pentadecoxybutyl, hexadecoxyethyl, hexadecoxypropyl, vinoxyethyl, vinoxypropyl, vinoxybutyl, vinoxypentyl, vinoxyhexyl, vinoxyoctyl, vinoxynonyl, vinoxydecyl, vinoxydodecyl, vinoxytetradecyl, vinoxyhexadecyl, alloxyethyl, alloxypentyl, alloxyoctyl, alloxyundecyl, alloxytetradecyl, alloxyhexadecyl, butenoxyethyl, butenoxybutyl, butenoxyheptyl, butenoxydecyl, butenoxydodecyl, butenoxypentadecyl, pentenoxyethyl, pentenoxypentyl, pentenoxydecyl, pentenoxytetradecyl, hexenoxyethyl, hexenoxyhexyl, hexenoxynonyl, hexenoxytridecyl, heptenoxyethyl, heptenoxypentyl, heptenoxyheptyl, heptenoxydodecyl, octenoxyethyl, octenoxybutyl, octenoxyhexyl, octenoxyoctyl, octenoxydecyl, nonenoxyethyl, nonenoxypentyl, nonenoxynonyl, nonenoxydecyl, decenoxyethyl, decenoxypropyl, decenoxybutyl, decenoxyhexyl, decenoxynonyl, undecenoxyethyl, undecenoxybutyl, undecenoxyoctyl, dodecenoxyethyl, dodecenoxybutyl, dodecenoxypentyl, dodecenoxyheptyl, tridecenoxyethyl, tridecenoxyhexyl, tetradecenoxyethyl, tetradecenoxypentyl, pentadecenoxyethyl, pentadecenoxybutyl, hexadecenoxyethyl, heptadecenoxyethyl, cyano, cyanomethyl, cyanoethyl, cyanopropyl, cyanobutyl, cyanopentyl, cyanoheptyl, cyanooctyl groups, and the like.

It is preferred that both of the nitrogen atoms in the heterocyclic amide have a hydrogen atom connected thereto.

Illustrative of the heterocyclic amides that may be employed as reactants in the present invention include
hydantoin,
thiohydantoin,
dithiohydantoin,
imidazolidindione,
thioimidazolidindione,
imidazolidindithione,
piperazindione
thiopiperazindione,
piperazindithione,
piperimidindione,
thiopiperimidindione,
piperimidindithione,
3-methylhydantoin,
1-methylhydantoin,
3-ethyl hydantoin,
3-cyclohexylhydantoin,
3-dodecylhydantoin,
3-(4-propylcyclohexyl)hydantoin,
5,5-pentamethylenehydantoin,
3-phenylhydantoin,
1-phenylhydantoin,
3-benzylhydantoin,
1-benzylhydantoin,
1-naphthylethylhydantoin,
3-(p-octylphenyl)hydantoin,
1-(p-octylphenylethyl)hydantoin,
1-(2-hydroxyethyl)hydantoin,
3-(6-hydroxyoctyl)hydantoin,
1-vinylhydantoin,
3-vinylhydantoin,
1-(3-octenyl)hydantoin,
3-(6-octadecenyl)hydantoin,
1-(2-aminoethyl)hydantoin,
3-(4-aminohexyl)hydantoin,
1-(4-methoxyoctyl)hydantoin,
3-(6-octoxydecyl)hydantoin,
1-(2-vinoxyethyl)hydantoin,
3-(4-vinoxybutyl)hydantoin,
1-[4-(6-octenoxy)butyl]hydantoin,
3-[6-(4-hexenoxy)hexyl]hydantoin,
1-cyanohydantoin,
3-cyananohydantoin,
1-(2-cyanoethyl)hydantoin,
3-(4-cyanobutyl)hydantoin,
1-(6-cyanohexyl)hydantoin,
1-tetradecyl-2-thiohydantoin,
1-dodecyl-2,4-dithiohydantoin,
3-decyl-4-thiohydantoin,
1-cyclopentyl-2-thiohydantoin,
3-cyclohexyl-4-thiohydantoin,
1-phenyloctyl-2-thiohydantoin,
3-(p-butylphenyl)-2,4-dithiohydantoin,
1-(4-hydroxybutyl)-4-thiohydantoin,
3-(6-hydroxyhexyl)-2-thiohydantoin,
1-vinyl-2,4-dithiohydantoin,
3-vinyl-2-thiohydantoin,
1-(5-decenyl)-2-thiohydantoin,
3-(4-dodencyl)-4-thiohydantoin,
1-(8-aminooctyl)-2-thiohydantoin,
3-(8-aminooctyl)-2,4-dithiohydantoin,
1-(6-ethoxydecyl)-4-thiohydantoin,
3-(8-propoxydecyl)-2-thiohydantoin,
1-(6-vinoxyhexyl)-2-thiohydantoin,
3-(6-vinoxyhexyl)-2-thiohydantoin,
1-cyano-2-thiohydantoin,
3-cyano-2-thiohydantoin,
1-cyano-2,4-dithiohydantoin,
1-(4-cyanobutyl)-2-thiohydantoin,
3-(6-cyanohexyl)-4-thiohydantoin,
1-propyl-2,5-piperazindione,
1-butyl-2,3-piperazindione,
1-hexyl-2,6-piperazindione,
4-ethyl-2,5-piperazindione,
4-pentyl-2,3-piperazindione,
4-octyl-2,6-piperazindione,
1-cyclohexyl-2,5-piperazindione,
4-cyclohexyl-2,3-piperazindione,
1-cyclopentyl-2,6-piperazindione,
4-(3-ethylcyclohexyl)-2,3-piperazindione,
1-phenyl-2,6-piperazindione,
1-benzyl-2,5-piperazindione,
4-naphthylethyl-2,3-piperazindione,
1-(p-hexylphenyl)-2,5-piperazindione,
1-(p-octylphenylethyl)-2,6-piperazindione,
1-(2-hydroxyethyl)-2,5-piperazindione,
1-(6-hydroxyoctyl)-2,3-piperazindione,
4-(3-hydroxypentyl)-2,6-piperazindione,
1-vinyl-2,5-piperazindione,
4-vinyl-2,6-piperazindione,
1-(4-octenyl)-2,3-piperazindione.
4-(8-tetradecenyl)-2,5-piperazindione,
1-(2-aminoethyl)-2,3-piperazindione,
4-(4-aminobutyl)-2,6-piperazindione,
1-(3-methoxypentyl)-2,5-piperazindione,
1-(6-octoxynonyl)-2,3-piperazindione,
4-(2-vinoxyethyl)-2,3-piperazindione,
1-[4-(6-octenoxy)butyl]-2,6-piperazindione,
1-cyano-2,5-piperazindione,
4-cyano-2,3-piperazindione,
1-(2-cyanoethyl)-2,6-piperazindione,
4-(6-cyanohexyl)-2,5-piperazindione,
1-ethyl-2-thio-5-piperazinone,
4-ethyl-2,5-piperazindithione,
1-propyl-2-thio-3-piperazinone,
4-cyclohexyl-2,3-piperazindithione,
1-decyl-2-thio-6-piperazinone,
4-dodecyl-2,6-piperazindithione,
1-(3-butylcyclohexyl)-2-thio-5-piperazinone,
4-phenyl-2,5-piperazindithione,
4-phenyl-2,6-piperazindithione,
4-benzyl-2-thio-3-piperazinone,
1-naphthyl-propyl-2,3-piperazindithione,
1-(p-butylphenyl)-2,3-piperazindithione,
4-(p-octylphenylethyl)-2,3-piperazindithione,
1-(2-hydroxyethyl)-2,5-piperazindithione,
4-(3-hydroxyhexyl)-2,6-piperazindithione,
1-vinyl-2-thio-6-piperazinone,
4-vinyl-2-thio-3-piperazinone,
1-(5-octenyl)-2-thio-5-piperazinone,
4-(10-octadecenyl)-2-thio-6-piperazinone,
1-(2-aminoethyl)-2-6-piperazindithione,
4-(4-aminobutyl)-2-thio-3-piperazinone,
1-(5-aminooctyl)-2-thio-5-piperazinone,
1-(4-ethoxyhexyl)-2,3-piperazindithione,
4-(6-octoxyoctyl)-2,6-piperazindithione,
1-(2-vinoxyethyl)-2,5-piperazindithione,
4-[3-(6-octenoxy)pentyl]-2-thio-3-piperazinone,
1-cyano-2-thio-6-piperazinone,
4-cyano-2-thio-5-piperazinone,
1-(2-cyanoethyl)-2,3-piperazindithione,
1-(4-cyanooctyl)-2,5-piperazindithione,
1-decyl-5-thio-2-piperazinone,
4-cyclohexyl-3-thio-2-piperazinone,
1-phenyl-6-thio-2-piperazinone,
4-benzyl-5-thio-2-piperazinone,
1-naphthylbutyl-3-thio-2-piperazinone,
4-(3-hydroxyhexyl)-6-thio-2-piperazinone,
4-(8-hydroxyoctyl)-5-thio-2-piperazinone,
1-phenyl-3-thio-2-piperazinone,
4-allyl-6-thio-2-piperazinone,
1-(3-aminobutyl)-5-thio-2-piperazinone,
1-(4-aminooctyl)-3-thio-2-piperazinone,
4-(6-methoxyoctyl)-6-thio-2-piperazinone,
1-(2-vinoxyethyl)-5-thio-2-piperazinone,
4-(3-alloxypentyl-3-thio-2-piperazinone, 1-cyano-6-thio-2-piperazinone,
4-(3-cyanopropyl)-5-thio-2-piperazinone,
1-(8-cyanooctyl)-3-thio-2-piperazinone,
4-(3-cyanobutyl)-6-thio-2-piperazinone,
3-ethyl-2,4-piperimidindione,
3-butyl-4,6-piperimidindione,
3-cyclobutyl-2,4-piperimidindione,
1-phenyl-4,6-piperimidindione,
1-benzyl-2,4-piperimidindione,
3-naphthylethyl-4,6-pipermidindione,
3-(p-octylphenyl)-2,4-piperimidindione,
3-(p-octylphenylethyl)-2,4-piperimidindione,
3-(2-hydroxyethyl)-4,6-piperimidindione,
3-(6-hydroxyhexyl)-2,4-piperimidindione,
3-vinyl-4,6-piperimidindione,
1-allyl-2,4-piperimidindione,
3-(6-octadecenyl)-2,4-piperimidindione,
1-(2-butylaminoethyl)-2,4-piperimidindione,
1-(4-dimethylaminobutyl)-4,6-piperimidindione,
3-(4-butoxypentyl)-4,6-piperimidindione,
1-(6-hexoxyhexyl)-2,4-piperimidindione,
1-(2-vinoxyethyl)-2,4-piperimidindione,
1-(4-alloxybutyl)-4,6-piperimidindione,
1-cyano-4,6-piperimidindione,
1-cyano-2,4-piperimidindione,
3-(2-cyanoethyl)-2,4-piperimidindione,
1-(4-cyanohexyl)-4,6-piperimidindione,
3-butyl-2-thio-4-piperimidinone,
3-hexyl-4-thio-6-piperimidinone,
3-octyl-6-thio-4-piperimidinone,
3-cyclohexyl-4-thio-2-piperimidinone,
1-cyclohexyl-2,4-piperimidindithione,
1-phenyl-4,6-piperimidindithione,
3-benzyl-4-thio-6-piperimidinone,
3-naphthylethyl-4,6-piperimidindithione,
3-(p-propylphenyl)-4-thio-2-piperimidinone,
3-(2-hydroxybutyl)-2,4-piperimidindithione,
1-(8-hydroxyoctyl)-6-thio-4-piperimidinone,
3-vinyl-2-thio-4-piperimidinone,
3-allyl-4,6-piperimidindithione,
1-(4-octenyl)-6-thio-4-piperimidinone,
3-(10-tetradecenyl)-6-thio-4-piperimidinone,
3-(2-aminobutyl)-2,4-piperimidindithione,
1-(5-aminopentyl)-4-thio-2-piperimidinone,
3-(4-ethoxyhexyl)-2,4-piperimidindithione,
3-(6-octoxydecyl)-2-thio-4-piperimidinone,
1-(2-vinoxyethyl)-4,6-piperimidindithione,
3-(3-alloxypropyl)-4-thio-6-piperimidinone,
1-cyano-6-thio-4-piperimidinone,
1-cyano-4-thio-2-piperimidinone,
3-(6-cyanohexyl)-2-thio-4-piperimidinone,
3-(4-cyanobutyl)-4-thio-6-piperimidinone,
5-methylhydantoin,
5,5-dimethylhydantoin,
5-dodecylhydantoin,
5-ethyl-2-thiohydantoin,
5-dodecyl-4-thio-hydantoin,
1-ethyl-5-propyl-2-,4-dithiohydantoin,
1-butyl-5-octylhydantoin,
3-hexyl-5-octyl-4-thiohydantoin,
3-ethyl-5,5-dimethyl-2,4-dithiohydantoin,
1-methyl-2,5-piperazindione,
4-methyl-3-ethyl-6-butyl-2,5-piperazindione,
1-propyl-3-hexyl-2,3-piperazindione,
1-butyl-6-propyl-2,6-piperazindione,
1-octyl-3-butyl-2-thio-5-piperazinone,
1,3-dibutyl-2,5-piperazindithione,
1,3,6-trimethyl-2-thio-3-piperazinone,
3,3-dimethyl-2,3-piperazindithione,
3,3,6,6-tetramethyl-2,5-piperazindione,
3,3,6-triethyl-2,3-piperazindione,
1-butyl-3-octyl-2-thio-6-piperazinone,
4-butyl-6-hexy-2,6-piperazindithione,
4-methyl-6,6-diethyl-5-thio-2-piperazinone,
4-butyl-6,6-dimethyl-3-thio-2-piperazinone,
3,3-dipropyl-6-thio-2-piperazinone,
1-methyl-4-ethyl-2,4-piperimidindione,
3-methyl-5,5-diethyl-4,6-piperimidindione,
4,4,5,5-tetramethyl-2-thio-4-piperimidinone,
2,2,5-trimethyl-4-thio-6-piperimidinone,
3,4,5-trimethyl-4-thio-2-piperimidinone,
1,2,5-triethyl-6-thio-4-piperimidinone,
3-octyl-4-butyl-2,4-piperimidindithione,
3-methyl-5-hexyl-4,6-piperimidindithione,
4,5-diethyl-2,4-piperimidindione,
2,5-dibutyl-4,6-piperimidindione,
3-propyl-5-hexyl-2-thio-4-piperimidinone,
3-methyl-2,5-diethyl-4-thio-2-piperimidinone,
3-propyl-4-decyl-2,4-piperimidindithione,
3-butyl-5-hexyl-6-thio-4-piperimidinone,
1-ethyl-2,5-dipropyl-4,6-piperimidindithione,
1-cyclohexyl-5-butyl-4-thio-6-piperimidinone,
1-(p-butylphenyl)-5-dimethylhydantoin,
3-naphthylethyl-4-butyl-2-thiohydantoin,
1-(2-hydroxypropyl)-4,4-dimethyl-4-thiohydantoin,
3-(4-hydroxybutyl)-5-octyl-2,4-dithiohydantoin,
1-(3-nonenyl)-3-octyl-2,5-piperazindione,
4-(4-octenyl)-6,6-dimethyl-2,3-piperazindione,
1-(2-methoxyethyl)-3,5-dipropyl-2,6-piperazindione,
1-cyano-3,6-diethyl-2-thio-5-piperazinone,
4-cyano-3,3,6-trimethyl-3-thio-2-piperazinone,
1-(4-cyanohexyl)-6-pentyl-2,6-piperazindithione,
4-(4-cyanohexyl)-5,6-dimethyl-2,3-piperazindithione,
4-cyclohexyl-6-octyl-2,5-piperazindithione,
4-[4-(6-decenoxy)hexyl]-5-decyl-2-thio-3-piperazinone,
4-(4-hydroxybutyl)-3,6-dipropyl-5-thio-2-piperazinone,
4-(5-aminopentyl)-5-butyl-6-thio-2-piperazinone,
4-cyano-5-hexyl-2-thio-6-piperazinone,
1-(3-cyanopropyl)-3,6-dibutyl-2,5-piperazindione,
1-cyclopentyl-5,6-diethyl-2,3-piperazindione,
1-benzyl-5-octyl-6-hexyl-2,6-piperazindione,
1-ethylnaphthylethyl-3-propyl-2-thio-5-piperazinone,
1-(4-hydroxyoctyl)-5,5-dipentyl-2,3-piperazindithione,
1-vinyl-3,6-dibutyl-2,6-piperazindithione,
3-(4-aminobutyl)-4,5-dibutyl-2,4-piperimidindione,
3-(8-methoxyoctyl)-2,5-dipropyl-4,6-piperimidindione,
3-(2-vinoxyethyl)-4,4,5-triethyl-2-thio-4-piperimidinone,
3-cyano-2,2,4,4-tetramethyl-6-thio-4-piperimidinone,
3-(2-cyanobutyl)-5-octadecyl-4-thio-6-piperimidinone,
3-allyl-4,5-dibutyl-2,4-piperimidindithione,
3-benzyl-2,5-dipentyl-4,6-piperimidindithione,
1-cyano-5-dodecyl-4-thio-2-piperimidinone,
3-phenyl-4-dodecyl-5-methyl-2,4-piperimidindione, and
1-(4-aminobutyl)-2,5-dibutyl-4,6-piperimidindione.

The α,β-unsaturated compounds employed in this invention correspond to the formula $$CH_2=C-T$$
$$\phantom{CH_2=C-}Q$$

in which Q is a hydrogen atom, an alkyl group of one to eight carbon atoms, or the group

—CH$_2$CH$_2$CH(CH$_3$)—T to be more fully described hereinafter. T may stand for a cyano group, the group —CONZ$_2$ in which Z may stand for a hydrogen atom or an alkyl group of one to four carbon atoms, or the group —COOR. The symbol R represents a monovalent esterifying group of preferably one to fourteen carbon atoms and, preferably, alkyl groups of one to fourteen carbon atoms, alkoxyalkyl groups of two to fourteen carbon atoms, aralkyl and alkaralkyl groups of seven to fourteen carbon atoms, and cycloalkyl and alkylcycloalkyl groups of three to fourteen carbon atoms. The alkyl groups may be straight or branched chains in any of the known spatial configurations. The alkyl groups positioned on cyclic structures may occupy any possible ring location.

Typical of the representations of Q include a hydrogen atom, the groups methyl, ethyl, propyl, butyl, hexyl, and octyl, and the groups —CH$_2$CH$_2$CH(CH$_3$)—T.

Typical of the groups that may be employed as T include cyano, carbamoyl, methylcarbamoyl, ethylcarbamoyl, propylcarbamoyl, butylcarbamoyl, dimethylcarbamoyl, diethylcarbamoyl, dibutycarbamoyl, methylethylcarbamoyl, ethylbutycarbamoyl, propylbutylcarbamoyl, methoxycarbonyl, ethoxycarbonyl, propoxycarbonyl, butoxycarbonyl, octoxycarbonyl, dodecoxycarbonyl, tetradecoxycarbonyl, methoxymethoxycarbonyl, methoxyethoxycarbonyl, methoxypropoxycarbonyl, methoxybutoxycarbonyl, methoxyoctoxycarbonyl, methoxydecoxycarbonyl, ethoxymethoxycarbonyl, ethoxyethoxycarbonyl, ethoxypropoxycarbonyl, ethoxyoctoxycarbonyl, propoxyethoxycarbonyl, propoxypropoxycarbonyl, propoxypentoxycarboyl, propoxyheptoxycarbonyl, butoxymethoxycarbonyl, butoxyethoxycarbonyl, butoxybutoxycarbonyl, butoxynonoxycarbonyl, butoxydecoxycarbonyl, pentoxymethoxycarbonyl, pentoxybutoxycarbonyl, pentoxypentoxycarbonyl, pentoxyhexoxycarbonyl, pentoxyoctoxycarbonyl, hexoxymethoxycarbonyl, hexoxypropoxycarbonyl, hexoxyhexoxycarbonyl, hexoxyoctoxycarbonyl, heptoxymethoxycarbonyl, heptoxybutoxycarbonyl, heptoxyheptoxycarbonyl, octoxymethoxycarbonyl, octoxyethoxycarbonyl, octoxybutoxycarbonyl, octoxyhexoxycarbonyl, benzoxycarbonyl, phenylethoxycarbonyl, phenylbutoxycarbonyl, ethylbenzoxycarbonyl, phenylbutoxycarbonyl, phenylhexoxycarbonyl, phenyloctoxycarbonyl, butylbenzoxycarbonyl, naphthylmethoxycarbonyl, naphthylethoxycarbonyl, naphthylpropoxycarbonyl, naphthylbutoxycarbonyl, cyclopropoxycarbonyl, cyclobutoxycarbonyl, cyclopentoxycarbonyl, cyclohexoxycarbonyl, butylcyclopentoxycarbonyl, octylcyclohexoxycarbonyl, cyclopentylheptoxycarbonyl, and cyclohexyloctoxycarbonyl.

Illustrative of the $\alpha,\beta$-unsaturated compounds that may be used as reactants in this invention include acrylonitrile,
methacrylonitrile,
$\alpha$-butylacrylonitrile,
$\alpha$-octylacrylonitrile,
acrylamide,
methacrylamide,
$\alpha$-ethylacrylamide,
$\alpha$-propylacrylamide,
$\alpha$-octylacrylamide,
N-methylacrylamide,
N,N-dimethylacrylamide,
N-ethylmethacrylamide,
N-ethyl-N-propylmethacrylamide,
N-methyl-$\alpha$-ethylacrylamide,
N-methyl-N-butyl-$\alpha$-propylacrylamide,
N,N-di-(2-ethylhexyl)acrylamide,
N,N-dimethyl-$\alpha$-octylacrylamide,
methyl acrylate,
ethyl acrylate,
butyl acrylate,
octyl acrylate,
dodecyl acrylate,
tetradecyl acrylate,
methyl methacrylate,
butyl methacrylate,
decyl methacrylate,
methyl ethacrylate,
ethyl ethacrylate,
octyl ethacrylate,
methyl $\alpha$-propylacrylate,
butyl $\alpha$-propylacrylate,
nonyl $\alpha$-propylacrylate,
methyl $\alpha$-butylacrylate,
propyl $\alpha$-butylacrylate,
heptyl $\alpha$-butylacrylate,
methyl $\alpha$-hexylacrylate,
pentyl $\alpha$-hexylacrylate,
undecyl $\alpha$-hexylacrylate,
butyl $\alpha$-heptylacrylate,
methyl $\alpha$-octylacrylate,
dodecyl $\alpha$-octylacrylate,
methoxyethyl acrylate,
methoxydecyl acrylate,
ethoxypropylacrylate,
butoxyhexyl acrylate,
methoxymethyl methacrylate,
propoxydecyl methacrylate,
ethoxyethyl ethacrylate,
butoxyoctyl ethacrylate,
methoxydodecyl $\alpha$-propylacrylate,
pentoxypentyl $\alpha$-propylacrylate,
methoxybutyl $\alpha$-butylacrylate,
butoxyhexyl $\alpha$-butylacrylate,
ethoxyheptyl $\alpha$-pentylacrylate,
methoxyoctyl $\alpha$-hexylacrylate,
propoxybutyl $\alpha$-heptylacrylate,
butoxybutyl $\alpha$-octylacrylate,
benzyl acrylate,
naphthylmethyl acrylate,
phenylethyl methacrylate,
naphthylethyl methacrylate,
benzyl ethacrylate,
naphthylbutyl ethacrylate,
phenyloctyl $\alpha$-propylacrylate,
naphthylethyl $\alpha$-butylacrylate,
octylphenylethyl $\alpha$-pentylacrylate,
benzyl $\alpha$-hexylacrylate,
naphthylmethyl $\alpha$-heptylacrylate,
phenylhexyl $\alpha$-octylacrylate,
cyclohexyl acrylate,
cyclopentyl methacrylate,
cyclohexyl ethacrylate,
cyclobutyl $\alpha$-octylacrylate,
dimethyl $\alpha$-methylene-$\alpha'$-methyladipate,
methyl hexyl $\alpha$-methylene-$\alpha'$-methyladipate,
dimethoxyethyl $\alpha$-methylene-$\alpha'$-methyladipate,
hexoxyethyl methyl $\alpha$-methylene-$\alpha'$-methyladipate,
methyl benzyl $\alpha$-methylene-$\alpha'$-methyladipate,
dibenzyl $\alpha$-methylene-$\alpha'$-methyladipate,
methyl cyclohexyl $\alpha$-methylene-$\alpha'$-methyladipate,
dicyclopentyl $\alpha$-methylene-$\alpha'$-methyladipate,
methyl octylcyclohexyl $\alpha$-methylene-$\alpha'$-methyladipate,
ethyl naphthylethyl $\alpha$-methylene-$\alpha'$-methyladipate,
$\alpha$-methylene-$\alpha'$-methyladiponitrile,
$\alpha$-methylene-$\alpha'$-methyladipamide,
N,N'-dimethyl-$\alpha$-methylene-$\alpha$-methyladipamide,
N$\alpha$-N'-dibutyl-$\alpha$-methylene-$\alpha'$-methyladipamide,
N-butyl-N'-$\alpha$-methyleneadipamide,
N,N,N'-tetramethyl-$\alpha$-methylene-$\alpha'$-methyladipamide,
2-methylene-5-cyanohexanamide,
N-methyl-2-methylene-5-cyanohexanamide,
N-methyl-N-butyl-2-methylene-5-cyanohexanamide,
N,N-diethyl-2-methylene-5-cyanohexanamide,
2-methyl-5-cyano-5-hexenamide,
N-methyl-2-methyl-5-cyano-5-hexenamide,
N,N-dimethyl-2-methyl-5-cyano-5-hexenamide,
N-methyl-N-butyl-2-methyl-5-cyano-5-hexenamide,
methyl 2-methyl-5-cyano-5-hexenoate,
dodecyl 2-methyl-5-cyano-5-hexenoate,
butoxyethyl 2-methyl-5-cyano-5-hexenoate,
pentoxypentyl 2-methyl-5-cyano-5-hexenoate,
benzyl 2-methyl-5-cyano-5-hexenoate,
naphthylethyl 2-methyl-5-cyano-5-hexenoate,
cyclohexyl 2-methyl-5-cyano-5-hexenoate,
methyl 2-methylene-5-cyanohexanoate,
octyl 2-methylene-5-cyanohexanoate,
methoxyethyl 2-methylene-5-cyanohexanoate,
butoxybutyl 2-methylene-5-cyanohexanoate,
octylphenylethyl 2-methylene-5-cyanohexanoate,
naphthylbutyl 2-methylene-5-cyanohexanoate,
cyclopentyl 2-methylene-5-cyanohexanoate,
methyl 2-methyl-5-carbamoyl-5-hexenoate,
ethyl 2-methyl-5-methylcarbamoyl-5-hexenoate,
decyl 2-methyl-5-dimethylcarbamoyl-5-hexenoate, ethoxyethyl 2 - methyl - 5 - methylpropylcarbamoyl - 5- hexenoate,
octoxybutyl 2-methyl-5-butylcarbamoyl-5-hexenoate,
benzyl 2-methyl-5-ethylcarbamoyl-5- hexenoate,
cyclohexyl 2-methyl-5-carbamoyl-5-hexenoate,
butyl 2-methylene-5-carbamoylhexanoate,
tetradecyl 2-methylene-5- carbamoylhexanoate,
methoxyhexyl 2-methylene-5-methylcarbamoylhexanoate,
butoxypropyl 2-methylene-5-diethylcarbamoylhexanoate,
benzyl 2-methylene-5-methylethylcarbamoylhexanoate,
naphthylpropyl 2-methylene-5-propylcarbamoylhexanoate, and
cyclopentyl 2-methylene-5-dipropylcarbamoylhexanoate.

The reactants of this invention are compounds that are known or can be made by known methods. Two or more principal types of stable products are possible from the present process. When each of the nitrogen atoms in the heterocyclic amide reactant bears a hydrogen atom the predominant product is the one in which two equivalents of the defined α,β-unsaturated reactant unites with one equivalent of the heterocyclic amide. When the nitrogen atom in the L chain of the heterocyclic amide bears a substituent group, that is, when it has no hydrogen atom connected directly to it, the predominant product formed is the adduct of substantially equimolecular amounts of the defined heterocyclic amide and the α,β-unsaturated compound reactants. While the 2:1 adduct is preferred of the two types of products just described, either type of product is satisfactory for the present purposes.

It is also possible, in some instances, when the nitrogen atom in the L chain of the heterocyclic amide contains a hydroxyalkyl substituent and the α,β-unsaturated compound contains at least one ester group, to obtain a product in which one equivalent of the α,β-unsaturated compound adds to the nitrogen atom of the heterocyclic amide not in the L chain, and another equivalent adds to the hydroxyalkyl substituent by transesterification. These products are quite satisfactory for the present purposes.

Furthermore, if the nitrogen atom in the L chain of the heterocyclic amide contains an amino type of substituent with an available hydrogen atom on the amino nitrogen atom an additional equivalent amount of the defined α,β-unsaturated compound can add to that amino nitrogen atom as well as to the other ring nitrogen atom making a 2:1 adduct of a different formula. Also, it is possible to have four equivalents of the α,β-unsaturated compound add to the heterocyclic amide when that amide has each of the ring nitrogens with a hydrogen atom attached directly thereto and also has two active hydrogen atoms attached to a single carbon atom elsewhere in the ring of the amide reactant. This results in a 4:1 adduct. All of these adducts are useful for the present purposes and may be more fully understood hereinafter.

The products of this invention are made by bringing together at a reacting temperature in the presence of a strong alkaline catalyst a compound having the formula

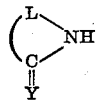

with one having the formula

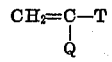

in which the symbols have the significance previously set forth. Temperatures in the range of about 0° to 200° C. are advantageously employed, with a range of about 25° to 175° C. preferred.

The α,β-unsaturated compounds are all liquids and the heterocyclic amides are generally solids. Since at least one of the reactants is always a liquid, a solvent is not absolutely necessary. However, in many instances, it is advantageous to employ an inert volatile organic solvent such as methanol, ethanol, butanol, benzene, toluene, xylene, dioxane, diethyl ether, dimethyl ether of ethylene glycol, dimethylformamide, and the like. At the conclusion of the reaction the solvent is readily removed such as by stripping, preferably at reduced pressures.

The present reaction is exothermic in nature and it is frequently advantageous to conduct the reaction by first adding all of the predetermined equivalent amount of the selected heterocyclic amide reactant to a reaction vessel along with the catalyst and a portion of the predetermined equivalent amount of the α,β-unsaturated compound reactant. In some cases, the above mixture requires some heating in order to initiate the reaction, after which a considerable heat of reaction becomes apparent. As the heat of reaction abates, additional portions of the α,β-unsaturated compound are introduced into the reaction vessel until all of the predetermined amount has been used. By using the above-described procedure, the present reaction is consistently conducted in an orderly manner. In many instances, it is entirely satisfactory to introduce all of the predetermined amounts of both of the reactants, particularly when the reactants have the higher molecular weights or substituent groups occupying considerable molecular space or both, in which situations a retarding ponderal effect is readily observable.

The time of reaction is not critical. Generally, times of about one-half hour to twenty-four hours are used, as conditions indicate. It is usually advantageous to conduct the present method for about an hour or two after the heat of reaction is finally dissipated. This is to maximize yields. Otherwise, the reaction may be concluded as one skilled in the art finds desirable.

A strong alkaline catalyst is used to effect the present method. Typical in this respect are alkali metals such as lithium, sodium, and potassium; alkali metal oxides such as lithium oxide, sodium oxide, and potassium oxide; alkali metal hydroxides such as lithium hydroxide, sodium hydroxide, and potassium hydroxide; alkali metal lower alkoxides such as lithium butoxide, sodium methoxide, and potassium ethoxide; alkali metal hydrides such as sodium hydride and potassium hydride; alkali metal amides such as sodium amide, lithium amide, and potassium amide; alkali metal lower alkyls and alkenyls such as methyl lithium, ethyl sodium, butyl potassium, allyl sodium, and butenyl potassium; phenylalkyl alkali metals such as benzyl sodium, phenylisopropyl potassium, and alkali metal aromatics such as phenyl sodium, phenyl lithium and phenyl potassium, phenylbutyl sodium; "Alfin" catalysts, which are commercial mixtures of alkali metal alkenyls and alkali metal alkenoxides, such as allyl sodium with sodium allyloxide and butenyl potassium with sodium butenyloxide; and quaternary ammonium bases such as trimethylbenzylammonium hydroxide and dimethyldibenzylammonium hydroxide and the corresponding alkoxides such as trimethylbenzylammonium butoxide, choline methoxide, and the like.

Yields up to 90% and over are consistently obtained. In some instances if appreciable amounts of impurities are present in the reactants the yields are somewhat reduced. Accordingly, it is preferred to employ reactants of as high a degree of purity as is conveniently and economically feasible.

At the conclusion of the reaction there may be added to the reaction system enough anhydrous mineral acid such as sulfuric, phosphoric, or the like, to neutralize the catalyst. The salt formed may be removed such as by filtration. Otherwise, the reaction system may be washed with water and the aqueous layer separated or decanted when the product is a solid. Any solvent employed may be stripped off, preferably under reduced pressure. Unused reactants when present may be washed out with water or stripped off under reduced pressure. If the product is a liquid it may be distilled, if desired. Solid products may be recrystallized in a conventional manner from a suitable solvent such as hexane, heptane, benzene, toluene, ethylene dichloride, chloroform, or the like.

While the products of this invention may be quite satisfactorily prepared according to the foregoing discussion, it may be advantageous in some instances, where ester groups are concerned and the desired R group is not lower alkyl, to first prepare the lower alkyl ester product and then make the desired higher molecular weight ester product by transesterification. This modification may be used, if desired, to transesterify a single ester group or two ester groups, depending of course on the particular product contemplated.

Transesterification may be conducted preferably in the presence of a strongly acidic esterifying catalyst including sulfuric acid, a lower alkanesulfonic acid, such as butanesulfonic acid, and an arylsulfonic acid, such as p-toluenesulfonic acid. It is, also, possible to employ a strongly acidic ion-exchange resin, such as a sulfonated polystyrene or sulfonated phenolformaldehyde resin.

Transesterification is preferably conducted at the reflux temperature of the reaction mixture, which is usually in the range of about 100° to 275° C., preferably in the range of about 150° to 225° C. The pressure is adjusted, when necessary, to conform to the above temperatures. Also, if desired, small amounts of an inert volatile organic solvent, such as toluene, xylene, or the like, may be used to help regulate the reflux temperature. A lower alkanol is distilled off as the transesterification progresses and the reaction is continued until the theoretical amount is collected.

At the termination of the transesterification, the product is isolated such as by neutralizing the catalyst, filtering, and distilling, preferably under reduced pressure.

The products of this invention have a wide variety of valuable utilities. The lower molecular weight members are excellent solvents for polymers particularly those in which acrylonitrile or a vinyl ester is the major component. The liquid members are useful as synthetic lubricants in which instances they consistently exhibit high viscosity indexes, low pour points, and low volatilities. The present products are useful as plasticizers, particularly for polyvinyl chloride. For instance, a mixture of 30 parts of 1,3 - bis(2-methoxycarbonylethyl)-5,5-dimethylhydantoin, 45 parts of polyvinyl chloride, 0.75 part of tribasic lead sulfate, and 0.4 part of stearic acid milled for seven minutes at 325° F. gave a tough, flexible film of good quality. Comparable results are obtained with the other products of this invention. The present products are effective fungicides when applied against Stemphylium sarcinaeforme and especially Monilinia fructicola in concentrations up to 1.0% in an inert carrier. These products are at the same time non-phytotoxic in concentrations approaching 1% as determined on tomato plants in a standard test.

The method and compounds of this invention may be more fully understood from the following examples which are offered by way of illustration but not by way of limitation. Parts by weight are used throughout.

*Example 1*

There are added to a reaction vessel equipped with a stirrer, a thermometer, and a condenser 64 parts of 5,5-dimethylhydantoin and two parts of sodium methoxide. There is added dropwise over a period of one hour 246 parts of methyl acrylate. There are then added five parts of sodium methoxide and 20 parts of dimethylformamide over a period of 25 minutes. The reaction mixture is heated to 110° C. and after the exothermic heat of reaction subsides the reaction mixture is maintained at 95° C. for four hours. The catalyst is neutralized with phosphoric acid. The mixture is filtered and distilled and the product is obtained by distillation at 180° to 190° C. at 0.4 mm. absolute pressure. The product contains 8.8% nitrogen (9.3% theoretical) and is identified as 1,3-bis- (2-methoxycarbonylethyl)-5,5 - dimethylhydantoin. The product corresponds to the formula

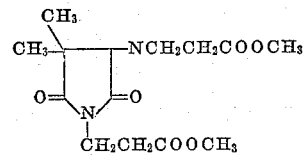

In a similar manner, there are prepared 3-(2-cyanoethyl)-5-cyclohexylhydantoin from 5-cyclohexylhydantoin and acrylonitrile, 1-(p-octylphenyl)-3-(2-carbamoylethyl)-4-thiohydantoin from 1-(p-octylphenyl)-4-thiohydantoin and acrylamide, and 1-(4-methoxyoctyl)-3-[2,5-bis-(methoxycarbonyl)hexyl]-2,4-dithiohydantoin from 1-(4-methoxyoctyl)-2,4-dithiohydantoin and dimethyl α-methylene-α'-methyladipate.

*Example 2*

There are added to a reaction vessel 64 parts of 5,5-dimethylhydantoin, 20 parts of dimethylformamide, and one part of sodium methoxide. There is added over a period of 23 minutes 57 parts of acrylonitrile. There is then added 0.5 part sodium methoxide and the mixture is heated to 45° to 55° C. There is introduced two parts of trimethylbenzylammonium hydroxide in methanol. An exothermic heat of reaction is noticed which causes the temperature from the reaction mixture to rise to 95° C. After one hour and fifteen minutes the catalysts are neutralized with phosphoric acid. The reaction mixture is distilled and the product is recovered at 196° to 208° C. at 0.4 mm. absolute pressure. The product crystallizes in the receiver and has a melting point of 97.5°–98.0° C. It contains 23.6% nitrogen (23.9% theoretical) and is identified as 1,3-bis(2-cyanoethyl)-5,5-dimethylhydantoin.

In an analogous way using potassium amide as a catalyst there are made 1-octyl-3-(2-decoxycarbonylethyl)-5,5-dimethyl-2-thiohydantoin from 1-octyl-5,5-dimethyl-2-thiohydantoin and decyl acrylate, 1-(2-hydroxyhexyl)-3-(2-carbamoylethyl)-5-dodecyl-4-thiohydantoin from 1-(2-hydroxyhexyl)-5-dodecyl-4-thiohydantoin and acrylamide, and 1-vinyl-3-(2-cyanopropyl)-4-octyl-2,4-dithiohydantoin.

*Example 3*

Into a reaction vessel there is added dropwise over a period of 25 minutes 172 parts of methyl acrylate to a mixture of 57 parts of 2,5-piperazindione and two parts of sodium methoxide. An exothermic heat of reaction is noticed and after this subsides the mixture is heated at 80° C. for two hours. The reaction mixture is stripped under reduced pressure leaving the product which is washed with ethanol. The product contains 9.6% nitrogen (9.8% theoretical) and has a melting point of 107° to 109.5° C. The product corresponds to 1,4-bis(2-methoxycarbonylethyl)-2,5-piperazindione. The product corresponds to the formula

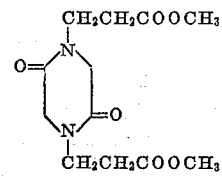

In like manner employing sodium metal as catalyst there are prepared 1-[4-(6-octenoxy)butyl]-4-(2-carbamoylpropyl)-2,3-piperazindione from 1-[4 - (6 - octenoxy)butyl]-2,3-piperazindione and methacrylamide, 1-(8-dimethylaminooctyl)-4 - (2,5 - dibenzyloxycarbonyl-hexyl)-2-thio-6-piperazinone from 1-(8-dimethylaminooctyl)-2-thio-6-piperazinone and dibenzyl α-methylene-α'-methyladipate, and 1-cyano-4-(2-cyanoethyl)-6,6-diethyl-2,5-piperazindithione from 1-cyano-6,6-diethyl-2,5-piperazindithione and acrylonitrile.

*Example 4*

There are added to a reaction vessel 11.4 parts of 5-methyl-2,4-piperimidindione and one part of sodium ethoxide. There is then added a mixture of 24 parts of methyl methacrylate and one part of sodium ethoxide over a period of 15 minutes. Reaction is exothermic and after the heat of reaction subsides, the reaction mixture is heated to 130° C. on an oil bath. The temperature is maintained at this level for two hours. The reaction mixture is distilled yielding the product which is identified as 1,3-bis(2-methoxycarbonylpropyl)-5-methyl-2,4-piperimidindione. The product corresponds to the formula

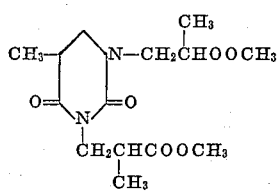

In a similar way using potassium t-butoxide as catalyst, there are made 1,3-bis(2-cyanoethyl)-5-methyl-2,4-piperimidindione from 5-methyl-2,4-piperimidindione and acrylonitrile, 1,3-bis(2-methoxycarbonylethyl)-2,4-piperimidindione from 2,4-piperimidindione and methyl acrylate, 1,3-bis[2,5-bis(methoxycarbonyl)-hexyl]-5-methyl-2,4-piperimidindione from 5-methyl-2,4-piperimidindione and dimethyl α-methylene-α'-methyladipate, and 1,3-bis-(2 - butoxycarbonylethyl)-5-methyl-2,4-piperimidindione from 5-methyl-2,4-piperimidindione and butyl acrylate.

*Example 5*

There are added to a reaction vessel 438 parts of 2,3-piperazindithione and 15 parts of sodium t-butoxide. Over a period of one and one-quarter hour there is added a mixture of 622 parts of methyl acrylate and 0.65 part of hydroquinone. At 15-minute intervals there is added four 2-part portions of soduim t-butoxide. The mixture is held at 120° to 125° C. for two hours. The catalyst is neutralized with phosphoric acid. The product is isolated by distillation at reduced pressure and corresponds to 1,4-bis(2-methoxycarbonylethyl)-2,3-piperazindithione.

In a similar way using as catalyst potassium isopropoxide, sodium metal, and potassium hydride, respectively, there are made 1-(4-butylaminohexyl)-4-(2,5-dicarbamoylhexyl)-2-thio-3-piperazinone from 1 - (4-butylaminohexyl)-2-thio-3-piperazinone and 2-methylene-5-methyladipamide, 1 - (5-decenyl)-4-(2,5-dicyanohexyl)-2,6-piperazindithione from 1-(5-decenyl)-2,6-piperazindithione and 2-methylene-5-methyladiponitrile, and 1-naphthylethyl - 4-(2-carbamoyl-5-cyanohexyl)-6-butyl-5-thio-2-piperazinone from 1-naphthylethyl-4-butyl-5-thio-2-piperazinone and 2-methylene-5-cyanohexanamide.

*Example 6*

Into a reaction vessel are added one part of potassium amide and 16.8 parts of 5,5-pentamethylenehydantoin. There is added over a period of six minutes 24 parts of ethyl acrylate and the mixture is warmed to 100° C. Five portions of 0.25 part each of potassium amide are added at intervals over a period of three hours. The temperature of the reaction mixture was gradually increased to 150 °C. and maintained at that figure for one hour. The catalyst is neutralized with phosphoric acid and the product distilled at reduced pressure. The product corresponds to 1,3 - bis(2 - ethoxycarbonylethyl)-5,5-pentamethylenehydantoin. The product corresponds to the formula

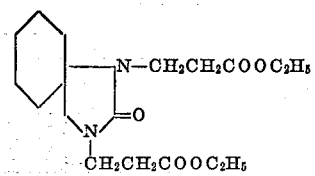

In like manner using ethyl sodium as catalyst there are made 1-(3,3,5,5-tetramethyl-2-octenyl)-3-(2-methoxycarbonylethyl)-5-butylhydantoin and N,N - dimethyl-2-methyl-5-cyano-5-hexenamide, 1 - (3-aminopropyl-3-[2-benzyloxycarbonyl - 5 - propylcarbamoylhexyl] - 5,5-dipropyl-2,4-dithiohydantoin from 1-(3-aminopropyl)-5,5-dipropyl-2,4-dithiohydantoin and benzyl 2-methylene-5-propylcarbamoylhexanoate, and 1-cyclohexyl-3-(2-cyclohexoxycarbonyl-5-cyanohexyl)-5,5-dimethyl-2-thiohydantoin from 1-cyclohexyl-5-5-dimethyl-2-thiohydantoin and cyclohexyl-2-methylene-5-cyanohexanoate.

*Example 7*

Into a reaction flask there are charged 0.25 part of sodium amide and 5.7 parts of 2,6-piperazindione. There is then added over a period of ten minutes 13.1 parts of butyl acrylate. An exothermic heat of reaction is observed and as the heat of reaction subsides there are added at a 20-minute interval two parts of 0.25 part of sodium amide. The reaction mixture is then heated to 110° C. for two and one-half hours. The catalyst is neutralized with mineral acid and the mixture distilled to give product. The product corresponds to 1,4-bis(2-butoxycarbonylethyl)-2,6-piperazindione.

In a similar manner using sodium as a catalyst, there are prepared 1-vinyl-4-(2-cyanoethyl)-3-thio-2-piperazinone from 1-vinyl-3-thio-2-piperazinone and acrylonitrile, 1 - (p-octylphenyl-4-(2-cyanoethyl)-6-thio-2-piperazinone from 1-(p-octylphenyl)-6-thio-2-piperazinone and acrylonitrile, 1-(2-benzyloxycarbonylethyl)-3,3-dimethyl-4-(p-dodecylphenyl)-2,5-piperazindione from 3,3-dimethyl-4-(p-dodecylphenyl)-2,5-piperazindione and benzyl acrylate, and 1-(2-carbamoylpropyl)-3,3-dimethyl-4-(3-cyanopropyl)-2,6-piperazindione from methacrylamide and 3,3-dimethyl-4-(3-cyanopropyl)-2,6-piperazindione.

*Example 8*

There are added to a reaction vessel 17.2 parts of 1-(2-hydroxyethyl)-5,5-dimethylhydantoin, 30 parts of methyl methacrylate, and one part of di-β-naphthol. A solution of 1.0 part of sodium methoxide in three parts of methanol is added slowly while the reaction mixture is heated to reflux and the distillate removed at a high reflux ratio. The reaction is concluded after one hour. The distillate contains methanol in amounts equal to that charged plus 90% of the theoretical amount for transesterification. The reaction mixture is neutralized with sulfuric acid and then distilled. The product is obtained as the distillate and identified as 1-(2-methacryloyloxyethyl)-3-(2-methoxycarbonylpropyl)-5,5-dimethylhydantoin and corresponds to the formula

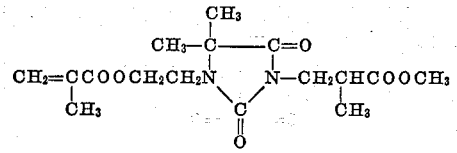

Similarly, there are prepared 1-(6-acryloyloxyhexyl)-3-(2-ethoxycarbonylethyl)-2,5-piperazindione from 1-(6-hydroxyhexyl)-2,5-piperazindione and ethyl acrylate, 1-(8 - acryloyloxyoctyl - 3 - (2 - butoxycarbonylethyl)-2,4-piperimidindione from 1-(8-hydroxyoctyl)-2,4-piperimidindione and butyl acrylate, and 1-(2-butoxycarbonylpropyl - 3 - (4 - methacryloyloxybutyl) - 2 - thio - 4- piperimidinone from 3-(4-hydroxybutyl)-2-thio-4-piperimidinone and butyl methacrylate.

*Example 9*

There are introduced into a reaction flask 32.7 parts of 2-phenyl-5,5-dimethyl-4,6-piperimidindione and 0.25 part of sodium methoxide. The mixture is warmed to 65° C. and 50 parts of methyl methacrylate is added in six minutes. The reaction mixture is heated to 100° C. and 0.25 part of sodium methoxide is introduced sending the temperature to 128° C. When the heat of reaction subsided the reaction mixture is heated at 120° to 125° C. for three-quarters of an hour. Phosphoric acid is added to neutralize the catalyst. The product is isolated by distillation at reduced pressure and is identified as 1,3-bis(2 - methoxycarbonylpropyl) - 2 - phenyl - 5,5 - dimethyl-4,6-piperimidindione.

Similarly, there are prepared 1,4-bis[2,5-bis(benzyloxycarbonyl)hexyl]-2,3-piperazindione from dibenzyl α-methylene-α′-methyladipate and 2,3-piperazindione, 1-(2-cyanoethyl) - 3 - decyl - 4 - [4 - (6 - decenoxy)hexyl]-6-thio-2-piperazinone from 3-decyl-4-[4-(6-decenoxy)-hexyl]-6-thio-2-piperazinone and acrylonitrile, and 1-(2-carbamoylethyl)-4-cyano-5-ethyl-2,6-piperazindione from 4-cyano-5-ethyl-2,6-piperazindione and acrylamide.

*Example 10*

Into a reaction flask there are charged two parts of sodium ethoxide and 20 parts of 4-(3-dimethylaminopropyl)-2,6-piperazindione. There is then added slowly 30 parts of diethyl α-methylene-α′-methyladipate. The reaction mixture is heated to 70° C. and 1.5 parts of sodium ethoxide is added whereupon an exothermic heat of reaction is noticed. A final portion of one part of sodium ethoxide is added one hour later. The reaction material is heated at 100° to 110° C. for two hours. The reaction mixture is allowed to come to room temperature and then 300 parts of toluene and 100 parts of water are added. The organic layer is separated and dried over magnesium sulfate. The low boiling purities are removed by stripping the organic layer to a temperature of 160° C. at 0.1 mm. absolute pressure. The product is recovered as the residue and corresponds to 1-[2,5-bis(ethoxycarbonyl)hexyl] - 4 - (3 - dimethylaminopropyl)-2,6-piperazindione.

There are prepared in like manner, 1-phenyl-3-(2-cyanoethyl)-5-dodecyl)-2-thiohydantoin from 1-phenyl-5-dodecyl-2-thiohydantoin and acrylonitrile, 1,3-bis(2-carbamoylethyl)-4,5-dibutyl-2,4-piperimidindione from 1-(2-carbamoylethyl)-4,5-dibutyl-2,4-piperimidindione and acrylamide, and 1-(2-methoxyoctoxycarbonylethyl)-3-(2-vinoxyethyl-4,5-dimethyl-4-thio-2-piperimidinone from 3-(2-vinoxyethyl)-4,5-dimethyl-4-thio-2-piperimidinone and methoxyoctyl acrylate.

*Example 11*

There are added to a reaction vessel 19 parts of 2-phenyl-4,6-piperimidindione, 25 parts of acrylonitrile, and three parts of potassium methoxide. A heat of reaction is observed and the reaction mixture is then heated to 150° to 155° C. for two hours. The catalyst is neutralized with sulfuric acid. The product is identified as 2 - phenyl - 1,1,4,5 - tetrakis(2 - cyanoethyl) - 4,6 - piperimidindione having the formula

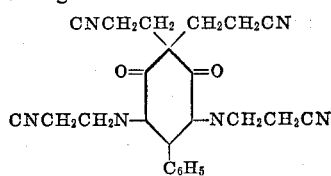

In like manner there are made 1-(8-methoxyoctyl)-3-(2 - methylcarbamoylethyl) - 5,5-dipropyl - 6 - thio - 4-piperimidinone from 1-(8-methoxyoctyl)-5,5-dipropyl-6-thio-4-piperimidinone and N-methylacrylamide, 1-benzyl-4 - [2,5 - bis(methoxycarbonyl)hexyl] - 5 - octyl - 6-hexyl-2,3-piperazindione from 1-benzyl-5-octyl-6-hexyl-2,3-piperazindione and methyl α-methylene-α′-methyladipate, and 1-(2-butenyl)-3-(2-methoxycarbonyl-5-benzoxycarbonylhexyl)-5,5-diethyl-4,6-piperimidindione from 1-(2-butenyl)-5,5-diethyl-4,6-piperimidindione and methyl benzyl α-methylene-α′-methyladipate.

*Example 12*

A reaction vessel is charged with three parts of potassium amide, 180 parts of toluene, and 57 parts of 2,5-piperazindione. There is then added dropwise over a period of one hour 60 parts of acrylonitrile. An exothermic heat of reaction is noticed and the temperature rises above 100° C. The reaction mixture is maintained at 110° to 115° C. for one hour. The catalyst is neutralized with phosphoric acid and the product is isolated by distillation at reduced pressure. Elemental analysis indicates that the product is 1,3-bis(2-cyanoethyl)-2,5-piperazindione.

In a similar way, there are made 1,3-bis(2-cyanoethyl)-2,4-dithiohydantoin from 2,4-dithiohydantoin and acrylonitrile, 1,3-bis(2-cyanoethyl)-2,4-piperimidinthione from 2,4-piperimidindithione and acrylonitrile, 1,4-bis(2-cyanoethyl)-2,5-piperazindithione from 2,5-piperazindithione and acrylonitrile, and 1,3,5,5-tetrakis(2-cyanoethyl)hydantoin from hydantoin and acrylonitrile.

*Example 13*

A reaction vessel is charged with 300 parts of 1,3-bis-(2 - methoxycarbonylethyl) - 5,5 - dimethylhydantoin and 300 parts of 2-ethylhexanol. The solution is heated at reflux until water no longer collects and the Dean-Stark water separator is attached to the flask. There is added five parts of sulfuric acid and the Dean-Stark separator is replaced by a column and distilling head. The reaction mixture is held at 150° C. and methanol is removed until the theoretical amount is collected. The reaction mixture is cooled, washed with aqueous 20% sodium carbonate solution and water, and then dried over anhydrous magnesium sulfate. The mixture is distilled and the product is collected as the distillate. The product is identified as 1,3-bis(2,2′-ethylhexoxycarbonylethyl)hydantoin.

In like manner there are made 1,3-bis(2,2′-ethylhexyloxycarbonylethyl) - 2,3 - piperazindithione, 1,4 - bis-(2,2′ - ethylhexoxycarbonylethyl) - 2,5 - piperazindione, and 1,3 - bis(2,2′ - ethylhexoxycarbonylethyl) - 2,4-piperimidindione from the corresponding methyl esters.

*Example 14*

There is transesterified 1,3-bis(2-methoxycarbonylethyl)-5,5-dimethylhydantoin with dodecanol in the presence of sulfuric acid according to Example 13. The product is isolated by distillation and identified as 1,3-bis(2-dodecoxycarbonylethyl)-5,5-dimethylhydantoin.

In an analogous way, there are made by transesterification, 1,3-bis(2-dodecoxycarbonylpropyl)-5-methyl-2,4-piperimidindione and 1,4-bis(2-dodecoxycarbonylethyl)-2,3-piperazindione and 1,3-bis(2-dodecoxycarbonylethyl)-5,5-pentamethylenehydantoin from the corresponding methyl esters.

I claim:

1. An adduct of the compounds

and

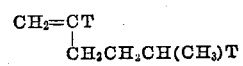

having the formula

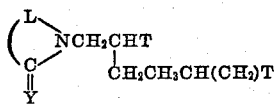

in which L is a three- to four-membered divalent chain containing one nitrogen atom and two to three carbon atoms, wherein one of the carbon atoms of L must have attached thereto a member from the class consisting of oxygen and sulfur and wherein there must be at least one carbon atom between the nitrogen atoms of the heterocyclic amide when that amide is considered in the counterclockwise direction, the remaining available carbon valences in said L chain being satisfied by members from the group consisting of a hydrogen atom and alkyl groups whose total carbon content is no greater than eighteen, the available valence of said nitrogen atom in said L chain being satisfied by a member from the group consisting of the

—CH₂CHT
  |
  CH₂CH₂CH(CH₃)T group, alkyl, cycloalkyl and alkylcycloalkyl groups of one to eighteen carbon atoms, aryl, alkylaryl, arylalkyl and alkylarylalkyl groups of six to eighteen carbon atoms, hydroxyalkyl groups of two to eight carbon atoms in which the hydroxy group is no closer than the beta position with respect to said nitrogen atom in said L chain, alkenyl groups of two to eighteen carbon atoms, aminoalkyl groups of two to eight carbon atoms in which the amino group is no closer than the beta position with respect to said nitrogen atom in said L chain, alkoxyalkyl groups containing up to nineteen carbon atoms in which the alkoxy portion contains up to eight carbon atoms and the alkyl portion contains at least two carbon atoms, alkenoxyalkyl groups containing up to nineteen carbon atoms in which the alkenoxy portion contains up to eight carbon atoms and the alkyl portion contains at least two carbon atoms, cyano groups, and cyanoalkyl groups in which the alkyl group contains up to eight carbon atoms, Y is a chalcogen having an atomic weight of 16 to 32, and T is a member from the group consisting of a cyano group, the group —CONZ₂ in which Z is a member from the group consisting of a hydrogen atom and alkyl groups of one to eight carbon atoms, and the group —COOR in which R is a member from the group consisting of alkyl groups of one to fourteen carbon atoms, alkoxyalkyl groups of two to fourteen carbon atoms, aralkyl and alkaralkyl groups of seven to fourteen carbon atoms, and cycloalkyl and alkylcycloalkyl groups of three to fourteen carbon atoms.

2. An adduct of the compounds

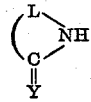

and

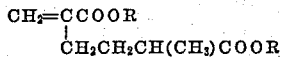

having the formula

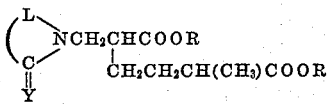

in which L is a three- to four-membered divalent chain containing one nitrogen atom and two to three carbon atoms wherein one of the carbon atoms of L has attached thereto an oxygen atom and wherein there is at least one carbon atom between the nitrogen atoms of the heterocyclic amide when that amide is considered in a counterclockwise direction, the remaining available valence of said nitrogen atom in said L chain being satisfied by an alkyl group of one to eighteen carbon atoms, the remaining available carbon valences in said L chain being satisfied by alkyl groups whose total carbon content is greater than 18, Y is a chalcogen having an atomic weight of 16 to 32 and R is an alkyl group of one to fourteen carbon atoms.

3. An adduct of the compounds

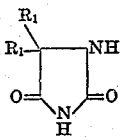

and

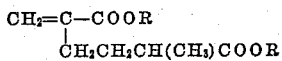

having the formula

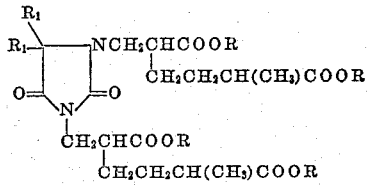

in which the R₁s represent an alkyl group whose total carbon content is no greater than eighteen and R is an alkyl group of from one to fourteen carbon atoms.

4. An adduct of 5,5-dimethylhydantoin and a dialkyl α-methylene-α'-methyladipate having the formula

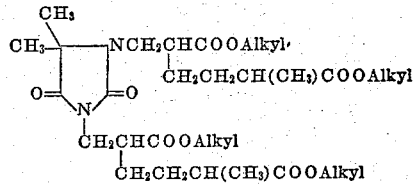

in which the alkyl portion contains one to fourteen carbon atoms.

5. An adduct of 5,5-dimethylhydantoin and dimethyl-α-methylene-α'-methyladipate having the formula

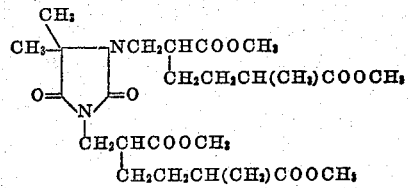

References Cited in the file of this patent
FOREIGN PATENTS

| | | |
|---|---|---|
| 859,314 | Germany | Dec. 11, 1952 |
| 722,541 | Great Britain | June 26, 1955 |
| 306,990 | Switzerland | July 16, 1955 |

OTHER REFERENCES

Dekker et al.: Jour. Biol. Chem., vol. 180, pp. 155–173 (1949).